(12) United States Patent
Nakagawa

(10) Patent No.: US 8,573,601 B2
(45) Date of Patent: Nov. 5, 2013

(54) SEALING DEVICE

(75) Inventor: Takehiro Nakagawa, Fukushima (JP)

(73) Assignee: NOK Corporation (JP)

( * ) Notice: Subject to any disclaimer, the term of this patent is extended or adjusted under 35 U.S.C. 154(b) by 610 days.

(21) Appl. No.: 12/680,101

(22) PCT Filed: Dec. 2, 2008

(86) PCT No.: PCT/JP2008/071836
§ 371 (c)(1),
(2), (4) Date: Mar. 25, 2010

(87) PCT Pub. No.: WO2009/075199
PCT Pub. Date: Jun. 18, 2009

(65) Prior Publication Data
US 2010/0259014 A1    Oct. 14, 2010

(30) Foreign Application Priority Data

Dec. 12, 2007    (JP) .................. 2007-320508

(51) Int. Cl.
*F16J 15/02*    (2006.01)

(52) U.S. Cl.
USPC .......................................... 277/551; 277/572

(58) Field of Classification Search
USPC .......................................... 277/551, 572, 573
See application file for complete search history.

(56) References Cited

U.S. PATENT DOCUMENTS

| | | | | |
|---|---|---|---|---|
| 3,306,223 A * | 2/1967 | Liebig | | 277/353 |
| 3,482,844 A * | 12/1969 | McKinven, Jr. | | 277/349 |
| 3,510,138 A * | 5/1970 | Bowen et al. | | 277/571 |
| 4,516,783 A * | 5/1985 | Mitsue et al. | | 384/482 |
| 5,024,364 A * | 6/1991 | Nash | | 277/364 |
| 5,129,744 A * | 7/1992 | Otto et al. | | 384/486 |
| 5,183,269 A * | 2/1993 | Black et al. | | 277/349 |
| 5,431,413 A * | 7/1995 | Hajzler | | 277/317 |
| 5,628,570 A * | 5/1997 | Sahashi et al. | | 384/448 |
| 5,813,675 A * | 9/1998 | Otto | | 277/549 |
| 6,170,992 B1 * | 1/2001 | Angelo et al. | | 384/477 |
| 6,450,503 B1 * | 9/2002 | Dossena et al. | | 277/572 |
| 6,634,648 B1 * | 10/2003 | Rockwell | | 277/572 |

(Continued)

FOREIGN PATENT DOCUMENTS

| JP | H3-67765 U | 7/1991 |
|---|---|---|
| JP | H4-4563 U | 1/1992 |

(Continued)

*Primary Examiner* — Vishal Patel
*Assistant Examiner* — L. Susmitha Koneru
(74) *Attorney, Agent, or Firm* — Harness, Dickey & Pierce, P.L.C.

(57) ABSTRACT

To prevent muddy water intrusion into a sliding section ($S_1$) of an oil seal lip (13), a sealing device (1) has an oil seal (10) mounted at an opening end (2a) of a housing (2) and a slinger (20) mounted axially outside the oil seal (10) on a rotating body (5), the oil seal (10) is formed from a rubber-like elastic material integrally with a metal reinforcement ring (11) and has the oil seal lip (13) slidably contacting with the outer peripheral surface of the rotating body (5) and a side lip (15) slidably contacting with the slinger (20), the reinforcement ring (11) has a sliding tube section (11b) radially outside a sliding section ($S_2$) of the side lip (15), and a external seal lip (23) provided on a radially outer section (22a) of the slinger (20) slidably contacts with the outer peripheral surface of the sliding tube section (11b).

2 Claims, 1 Drawing Sheet

(56) References Cited

U.S. PATENT DOCUMENTS

| | | | |
|---|---|---|---|
| 6,979,001 B2* | 12/2005 | Ohtsuki et al. | 277/549 |
| 6,991,234 B2* | 1/2006 | Oldenburg | 277/309 |
| 7,004,471 B2* | 2/2006 | Bryde et al. | 277/318 |
| 7,056,028 B2* | 6/2006 | Hosoda et al. | 384/486 |
| 7,232,129 B2* | 6/2007 | Kobayashi | 277/317 |
| 7,658,386 B2* | 2/2010 | Oldenburg | 277/353 |
| 7,926,816 B2* | 4/2011 | Shibayama et al. | 277/551 |
| 8,011,670 B2* | 9/2011 | Shibayama et al. | 277/551 |
| 8,016,294 B2* | 9/2011 | Shibayama et al. | 277/551 |
| 8,047,721 B2* | 11/2011 | Aritake et al. | 384/544 |
| 8,167,500 B2* | 5/2012 | Furukawa et al. | 384/484 |
| 2003/0031393 A1* | 2/2003 | Bellufi | 384/486 |
| 2004/0056428 A1* | 3/2004 | Yoshida | 277/572 |
| 2004/0201179 A1* | 10/2004 | Iwakata et al. | 277/572 |
| 2007/0076994 A1* | 4/2007 | Norimatsu et al. | 384/486 |
| 2008/0031556 A1* | 2/2008 | Heim et al. | 384/448 |
| 2009/0174151 A1* | 7/2009 | Kobayashi | 277/551 |
| 2011/0278800 A1* | 11/2011 | Kobayashi | 277/551 |

FOREIGN PATENT DOCUMENTS

| | | |
|---|---|---|
| JP | H4-17567 U | 2/1992 |
| JP | H5-54871 U | 7/1993 |
| JP | H7-33017 U | 7/1995 |
| JP | 2006-009930 A | 1/2006 |
| JP | 2006-125424 A | 5/2006 |
| JP | 3138507 U | 12/2007 |

* cited by examiner

SEALING DEVICE

CROSS-REFERENCE TO RELATED APPLICATIONS

This is a national stage of International Application No. PCT/JP2008/071836 filed on Dec. 2, 2008 and published in the Japanese language. This application claims the benefit of Japanese Application No. 2007-320508, filed on Dec. 12, 2007. The disclosures of the above applications are incorporated herein by reference.

BACKGROUND OF THE INVENTION

1. Field of the Invention

The present invention relates to a sealing device sealing a shaft periphery and the like of a portion which tends to be exposed to a muddy water or the like from an external portion, such as a transfer apparatus, a wheel bearing apparatus and the like of a vehicle, and more particularly to a sealing device provided with a structure preventing the muddy water or the like from making an intrusion into a sliding section of an oil seal lip.

2. Description of the Conventional Art

In a sealing device used for a transfer apparatus, a wheel bearing apparatus and the like of a vehicle, since a muddy water or the like tends to come in from an external portion, it is necessary to inhibit the muddy water or the like from making an intrusion into a sliding section of an oil seal lip as much as possible, thereby preventing a reduction of a sealing performance of the oil seal lip as much as possible. FIG. 2 is a half sectional view of an installed state and shows an example of this kind of sealing device in accordance with a conventional art by cuffing along a plane passing through an axis O.

In particular, in FIG. 2, reference numeral 2 denotes a housing of a transfer apparatus, reference numeral 3 denotes a rotating shaft which is inserted to the housing 2 and is supported in a state of being rotatable around an axis O via a bearing 4, reference numeral 5 denotes a sleeve which is spline fitted to an outer periphery of the rotating shaft 3 and is fixed by a nut 6, and reference numeral 7 denotes a packing which seals between the rotating shaft 3 and the sleeve 5. A companion flange 5a formed at an end portion of the sleeve 5 is connected to a propeller shaft (not shown) or the like.

A sealing device 100 is provided with a non-rotating oil seal 110 which is positioned at an outer side in an axial direction of the bearing 4 and is attached to an inner periphery of the housing 2, and a slinger 120 which is positioned at an outer side in an axial direction of the oil seal 110, is attached to an outer periphery of the sleeve 5, and is rotated integrally with the rotating shaft 3 and the sleeve 5.

Describing in detail, the oil seal 110 has an oil seal lip 111 which extends toward the bearing 4 side, and a side lip 112 which extends toward an opposite side (an outer side) to the oil seal lip 111. The oil seal lip 111 is structured such as to prevent a lubricating oil fed to the bearing 4 from leaking by being slidably brought into close contact with an outer peripheral surface of the sleeve 5, and the side lip 112 is structured such as to prevent a muddy water or the like coming in from an external portion A from making an intrusion into the oil seal lip 111 side by being slidably brought into close contact with a flange section 121 of the slinger 120. The slinger 120 itself has a throwing off action on the basis of centrifugal force generated in the flange section 121, and achieves an improvement of an effect of preventing the muddy water or the like from making an intrusion, by making an outer tube section 122 thereof to be near to an end portion of the housing 2 (refer, for example, to the following patent documents 1 to 3), or providing a conical tubular dust lip, in which a leading end has a large diameter, on a radially outer end portion of the slinger 120 and bringing it slidably into close contact with a radially outer edge portion of the housing 2 (refer, for example, to the following Japanese Utility Model Publication No. 7-33017).

Reference is made to Japanese Unexamined Patent Publication No. 2006-9930, Japanese Unexamined Utility Model Publication No. 5-54871, Japanese Unexamined Utility Model Publication No. 3-67765, and Japanese Utility Model Publication No. 7-33017.

However, in accordance with the sealing device 100 as shown in FIG. 2 (refer to Japanese Unexamined Patent Publication No. 2006-9930, Japanese Unexamined Utility Model Publication No. 5-54871 and Japanese Unexamined Utility Model Publication No. 3-67765), if a gap between the outer tube section 122 of the slinger 120 and the outer peripheral surface of the end portion of the housing 2 is made small, there is a risk that the outer tube section 122 comes into contact with the outer peripheral surface of the end portion of the housing 2 on the basis of a working tolerance, an eccentricity of the rotating shaft 3 or the like, so that it is not possible to make the gap sufficiently small. Therefore, it is impossible to sufficiently prevent the muddy water or the like from making an intrusion.

Further, as for the sealing device in which the radially outer end portion of the slinger 120 is provided with the conical tubular dust lip in which the leading end has the large diameter as shown in patent document 4, since a body portion of the dust lip comes into close contact with a radially outer edge of an opening end of the housing 2, it is not possible to obtain a sufficient fastening margin with respect to the housing 2, and particularly in the case that the sealing device is submerged in the muddy water at a time of traveling on a punishing road, it is hard to inhibit the muddy water from making an intrusion. Further, in order to improve a muddy water sealing performance, there can be considered to increase the number of the side lip 112 and the dust lip, however, in this case, not only the sealing device 100 is enlarged in size, but also there is a risk that a specific fuel consumption is lowered by an increase of sliding torque.

SUMMARY OF THE INVENTION

Problem to be Solved by the Invention

The present invention is made by taking the points mentioned above into consideration, and a technical object of the present invention is to provide a structure which can prevent muddy water or the like from making an intrusion into a sliding section of an oil seal lip as much as possible, in a sealing device sealing a periphery of a shaft or the like of a portion which tends to be exposed to the muddy water or the like from an external portion.

Means for Solving the Problem

As a means for effectively solving the technical problem mentioned above, in accordance with an aspect of the present invention, there is provided a sealing device comprising:

an oil seal attached to an inner peripheral surface of an opening end of a non-rotating housing; and a slinger attached to a rotating body inserted to the housing so as to be positioned at an axially outer side of the oil seal;

the oil seal being integrally formed by a rubber-like elastic material on a reinforcement ring constructed by a metal press molded product, wherein an oil seal lip slidably brought into close contact with an outer peripheral surface of the rotating body and a side lip slidably brought into close contact with the slinger are formed, a sliding tube section exposed from the rubber-like elastic material and positioned at a radially outer side of a sliding section of the side lip is formed on the reinforcement ring, and an external seal lip provided on a radially outer section of the slinger is slidably brought into close contact with an outer peripheral surface of the sliding tube section.

As another more preferable example of the structure mentioned above, the external seal lip is formed in such a shape that a leading end is bent so as to be directed to an inner peripheral side.

Effect of the Invention

In accordance with the sealing device on the basis of the present invention, since the external seal lip provided on the radially outer section of the slinger is slid in a close contact manner with the sliding tube section extended from the reinforcement ring, it is possible to effectively prevent a muddy water from making an intrusion into the sliding section of the side lip and further into the sliding section side of the oil seal lip.

Further, since the sliding tube section slidably coming into close contact with the external seal lip is extended from the reinforcement ring constructed by the metal press molded product, the outer peripheral surface of the sliding tube section is smooth. Accordingly, a sliding torque of the external seal lip is held down, and an excellent muddy water sealing performance can be obtained. Further, it is not necessary to apply an additional work for reducing a surface roughness to an outer peripheral surface of the sliding tube section, as is different from the case that the external seal lip is slidably brought into close contact with the outer peripheral surface of the opening end of the housing.

Further, if the external seal lip is formed in such a shape that the leading end is bent so as to be directed to the inner peripheral side, it is possible to set a sufficient fastening margin of the external seal lip with respect to the outer peripheral surface of the sliding tube section of the reinforcement ring at a time when the rotating body is rotated at a low speed, and the fastening margin of the external seal lip with respect to the outer peripheral surface of the sliding tube section is significantly lowered at a time of rotating at a high speed. Accordingly, it is possible to suppress sliding torque, heat generation and an abrasion.

DETAILED DESCRIPTION OF PREFERRED EMBODIMENT

Figure 1:
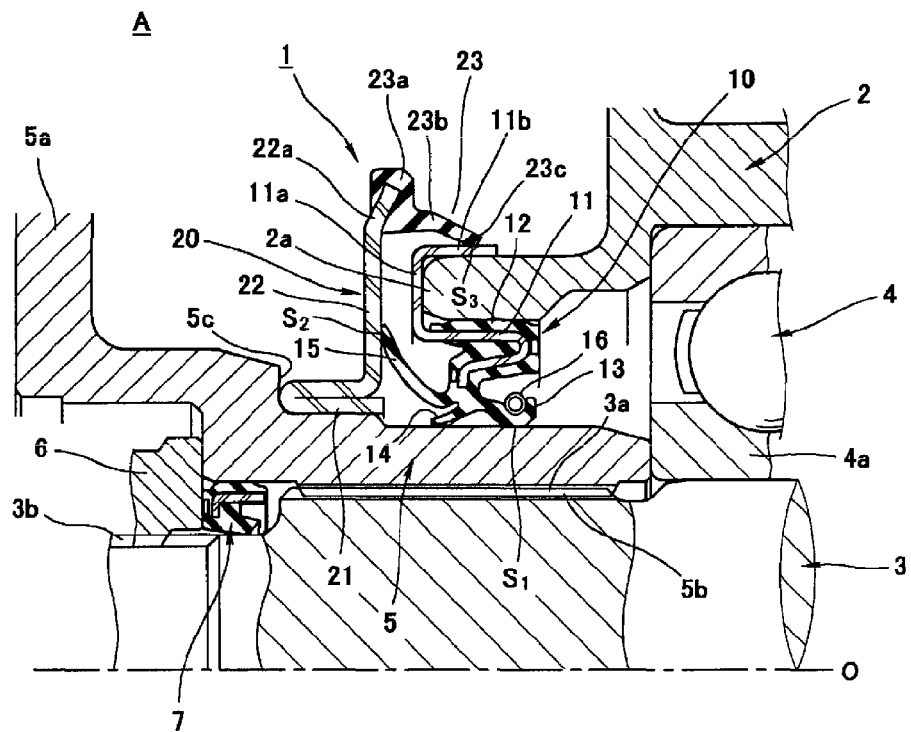
FIG. 1 is a half sectional view of an installed state, and shows a preferable embodiment of a sealing device in accordance with the present invention by cutting along a plane passing through an axis O.
Figure 2:
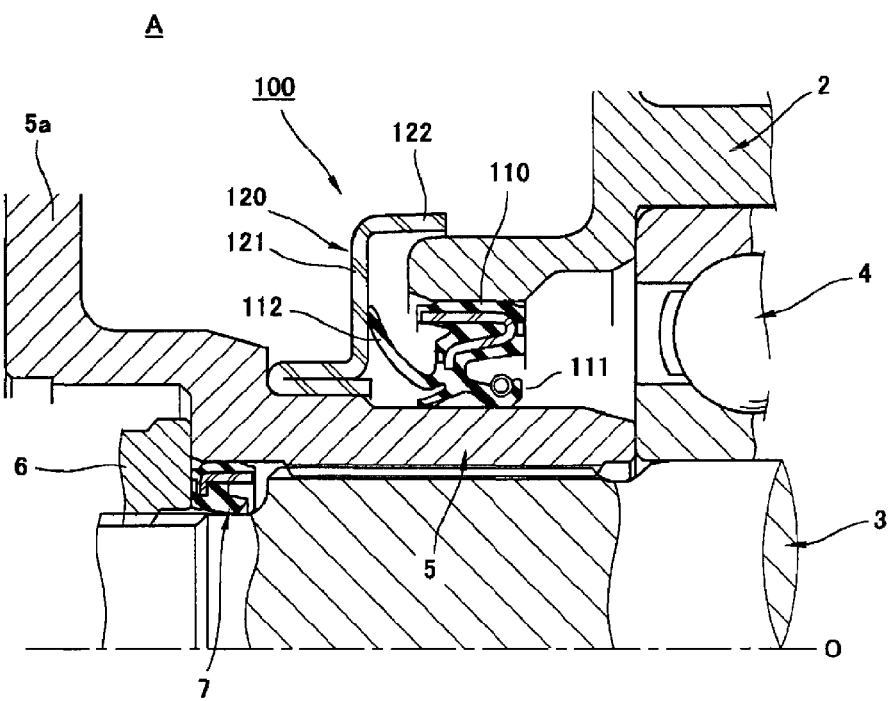
FIG. 2 is a half sectional view of an installed state, and shows an example of a sealing device in accordance with a conventional art by cutting along a plane passing through an axis O.

A description will be given below of an embodiment of a sealing device in accordance with the present invention with reference to the accompanying drawings. FIG. 1 is a half sectional view of an installed state, and shows a preferable embodiment of the sealing device in accordance with the present invention by cutting along a plane passing through an axis O.

In this FIG. 1, reference numeral 2 denotes a non-rotating housing in a transfer apparatus of a vehicle, reference numeral 3 denotes a rotating shaft inserted to the housing 2 and supported in a state of being rotatable around an axis O via a bearing 4, and reference numeral 5 denotes a sleeve positioned close to an inner peripheral side of an opening end 2a of the housing 2 so as to be outside inserted to the rotating shaft 3. In this case, the rotating shaft 3 and the sleeve 5 correspond to the rotating body described above in the first aspect.

The sleeve 5 is structured such that a spline section 5b which is formed on an inner peripheral surface thereof is fitted to a spline section 3a which is formed on an outer peripheral surface of the rotating shaft 3, and is fixed in an axial direction by a nut 6, which is positioned at an outer side in an axial direction and is engaged with a male thread section 3b formed on an outer peripheral surface of the rotating shaft 3, in a state that an end is brought into contact with an inner ring 4a of the bearing 4. A portion between the rotating shaft 3 and the sleeve 5 is sealed by a packing 7, which is interposed at a position axially outside the fitted portion of the spline sections 3a and 5b, and is prevented by the nut 6 from coming off. Further, a companion flange 5a is formed on an outer end portion of the sleeve 5, and is connected to a propeller shaft (not shown) or the like.

Reference numeral 1 denotes a sealing device in accordance with the present invention. The sealing device 1 is provided with an oil seal 10 which is attached to an inner peripheral surface of the opening end 2a of the housing 2, and a slinger 20 which is attached to an outer peripheral surface of the sleeve 5 outside inserted to the rotating shaft 3 in a state of being positioned at an axially outer side of the oil seal 10.

The oil seal 10 is integrally formed by a rubber-like elastic material on a reinforcement ring 11 which is manufactured by punch press molding of a metal plate, and is provided with an outer peripheral seal section 12 which is pressure inserted and fitted to the inner peripheral surface of the opening end 2a of the housing 2, an oil seal lip 13 which extends to the bearing 4 side from a radially inner position of the reinforcement ring 11 and is slidably brought into close contact with the outer peripheral surface of the sleeve 5 by an inner peripheral portion in the vicinity of a leading end thereof, a dust lip 14 which extends to an opposite side to the oil seal lip 13 from the radially inner position of the reinforcement ring 11 and is opposed in a close contact manner to or is slidably brought into close contact with the outer peripheral surface of the sleeve 5 by a leading end inner periphery thereof, and a side lip 15 which extends to an opposite side to the oil seal lip 13 from an outer peripheral side of a root of the dust lip 14 and extends so as to form such a conical tubular shape that a leading end has a large diameter. A garter spring 16 compensating a tension force is fitly attached to the oil seal lip 13.

A radially outer flange section 11a and a sliding tube section 11b, which are exposed from the outer peripheral seal section 12 made of a rubber-like elastic material, are provided at a radially outer section of the reinforcement ring 11 of the oil seal 10. Describing in detail, the radially outer flange section 11a of the reinforcement ring 11 extends to a radially outer side along an end most of the opening end 2a of the housing 2, and the sliding tube section 11b bent to an opposite side to the slinger 20 from a radially outer end portion thereof so as to extend in a cylindrical shape is outside inserted to the opening end 2a.

Meanwhile, the slinger 20 is manufactured by punch press molding of a metal plate, and has an radially inner tube section 21 which is pressure inserted and fitted to the outer peripheral surface of the sleeve 5, and a seal flange section 22 which expands in a disc shape in a radially outer direction from the radially inner tube section 21 so as to be slidably brought into close contact with the leading end portion of the side lip 15 of the oil seal 10.

An outer diameter of the seal flange section 22 of the slinger 20 is larger than an outer diameter of the opening end 2a of the housing 2, and an external seal lip 23 made of a rubber-like elastic material is integrally provided on a radially outer section 22a of the seal flange section 22. The external seal lip 23 is vulcanization bonded to the radially outer section 22a of the seal flange section 22 by a root 23a thereof, is formed to have such a sectional shape as to be bent at a lumbar part 23b so as to incline to an inner peripheral side, and is structured such that a leading end portion 23c is slidably brought into contact with an outer peripheral surface of the sliding tube section 11b of the reinforcement ring 11 which is closely fitted to the outer peripheral surface of the opening end 2a of the housing 2 at a radially outer side of a sliding section $S_2$ of the side lip 15 of the oil seal 10 with respect to the seal flange section 22, thereby forming a sliding section $S_3$.

In the sealing device 1 in accordance with the present invention constructed as mentioned above, the oil seal 10 is positioned and fixed to the housing 2 in such a manner as to achieve a state that the radially outer flange section 11a of the reinforcement ring 11 comes into contact with the end most of the opening end 2a, by pressure inserting the outer peripheral seal section 12, in which the reinforcement ring 11 is embedded, to the inner peripheral surface of the opening end 2a of the housing 2, and by outside inserting the sliding tube section 11b of the reinforcement ring 11 to the opening end 2a. In this case, it is not necessary to closely fit the sliding tube section 11b extended from the reinforcement ring 11 to the outer peripheral surface of the opening end 2a of the housing 2 in accordance with pressure insertion, and a clearance may exists between the outer peripheral surface of the opening end 2a and the sliding tube section 11b. On the other hand, the slinger 20 is positioned and fixed to the sleeve 5 by pressure inserting and fitting the radially inner tube section 21 to the outer peripheral surface of the sleeve 5 and by bringing the radially inner tube section 21 into contact with a step surface 5c formed in the outer peripheral surface of the sleeve 5, and the sleeve 5 is outside inserted to the rotating shaft 3 so as to be fixed, whereby an illustrated installed state is achieved.

The oil seal lip 13 of the oil seal 10 is structured such as to prevent a lubricating oil fed to the bearing 4 from leaking to an external portion A from the outer periphery of the sleeve 5, at a sliding section $S_1$ with the outer peripheral surface of the sleeve 5. Further, the side lip 15 of the oil seal 10 is structured such as to block an intrusion of muddy water or the like into an inner peripheral side on the basis of a throwing off operation of the seal flange section 22 caused by a close contact sliding motion with the seal flange section 22 and centrifugal force, at the sliding section $S_2$ with the seal flange section 22 of the rotating slinger 20, and the dust lip 14 of the oil seal 10 is structured such as to block an intrusion of muddy water or the like into the oil seal lip 13 side by being opposed in a close contact manner to or being slidably brought into close contact with the outer peripheral surface of the sleeve 5 at an inner peripheral side of the side lip 15.

Further, at the outside of the sliding sections of the oil seal lip 13, the dust lip 14 and the side lip 15, since the external seal lip 23 rotating together with the slinger 20 is slidably brought into close contact with the outer peripheral surface of the sliding tube section 11b of the reinforcement ring 11 which is closely fitted to the outer peripheral surface of the opening end 2a of the housing 2, and forms the sliding section $S_3$, it is possible to effectively prevent the muddy water or the like coming in from the external portion A from making an intrusion into the sliding section $S_2$ of the side lip 15.

Further, the external seal lip 23 is formed in such a shaped as to be bent to the inner peripheral side at the lumbar part 23b, whereby it is possible to set a sufficient fastening margin with respect to the outer peripheral surface of the sliding tube section 11b. In addition the reinforcement ring 11 is manufactured by punch press molding of the metal plate, and the outer peripheral surface of the sliding tube section 11b is sufficiently smooth in comparison with the outer peripheral surface of the opening end 2a of the housing 2 constructed by a cast product. Therefore, it is possible to obtain an excellent muddy water sealing performance without applying any additional work for reducing a surface roughness, and a sliding torque can be held down sufficiently.

In this case, centrifugal force acts on the external seal lip 23 rotating together with the slinger 20 in a direction of opening from the outer peripheral surface of the sliding tube section 11b of the reinforcement ring 11, however, for example, in such a case that a vehicle travels in a state that a whole of an illustrated portion is submerged into muddy water, a vehicle speed slows down, that is, a rotating speed of the rotating shaft 3 becomes low. Accordingly, the centrifugal force as mentioned above becomes small, and then the fastening margin of the external seal lip 23 with respect to the outer peripheral surface of the sliding tube section 11b of the reinforcement ring 11 is increased, whereby the muddy water sealing performance is enhanced. Further, since the rotating speed of the rotating shaft 3 is low, an influence given to the sliding torque caused by the increase of the fastening margin becomes small.

Further, since the rotating speed of the rotating shaft 3 becomes higher at a time of traveling at a high speed in a state that the illustrated portion is not submerged in muddy water, the centrifugal force acting on the external seal lip 23 becomes larger, and the fastening margin with respect to the outer peripheral surface of the sliding tube section lib of the reinforcement ring 11 is lowered. Accordingly, it is possible to effectively suppress rising of the sliding torque caused by the increase of the rotating speed, heat generation and an abrasion.

Further, even if muddy water or the like passing through the sliding section $S_3$ of the external seal lip 23 exists, an amount thereof is extremely small, and muddy water or the like mentioned above is prevented from making an intrusion into the inner peripheral side on the basis of the throwing off operation as described above, at the sliding section $S_2$ between the side lip 15 and the seal flange section 22. Further, since the dust lip 14 exists at the inner side thereof, it is possible to effectively prevent an early abrasion caused by an interposition of muddy water or a foreign material in the sliding section $S_1$ between the oil seal lip 13 and the sleeve 5, and it is possible to maintain an excellent oil sealing performance.

What is claimed is:
1. A sealing device comprising:
an oil seal attached to an inner peripheral surface of an opening end of a non-rotating housing; and a slinger attached to a rotating body inserted to said housing so as to be positioned at an axially outer side of said oil seal;

said oil seal being integrally formed by a rubber elastic material on a reinforcement ring constructed by a metal press molded product, wherein an oil seal lip slidably brought into close contact with an outer peripheral surface of said rotating body and a side lip slidably brought into close contact with said slinger are formed, a sliding tube section exposed from said rubber elastic material and positioned at a radially outer side of a sliding section of said side lip is formed on said reinforcement ring, and an external seal lip provided on a radially outer section of said slinger is slidably brought into close contact with an outer peripheral surface of the sliding tube section, and the external seal lip is formed in such a share that a leading end is bent so as to be directed to an inner peripheral side.

2. A sealing device comprising:

an oil seal attached to an inner peripheral surface of an opening end of a non-rotating housing; and a slinger attached to a rotating body inserted to said housing so as to be positioned at an axially outer side of said oil seal;

said oil seal being integrally formed by a rubber elastic material on a reinforcement ring constructed by a metal press molded product, wherein an oil seal lip slidably brought into close contact with an outer peripheral surface of said rotating body and a side lip having a sliding section slidably brought into close contact with said slinger are formed, a sliding tube section is provided extending from said reinforcement ring and positioned at a radially outer side of the sliding section of said side lip, an external seal lip provided on a radially outer section of said slinger is slidably brought into close contact with an outer peripheral surface of the sliding tube section, and the external seal lip is formed in such a shape that a leading end is bent so as to be directed to an inner peripheral side.

* * * * *